US012626444B1

(12) United States Patent
Lesser et al.

(10) Patent No.: US 12,626,444 B1
(45) Date of Patent: May 12, 2026

(54) SYSTEMS AND METHODS FOR GENERATING A SPLAT REPRESENTATION OF A THREE-DIMENSIONAL ASSET WITHOUT AN ITERATIVE RENDERING PHASE

(71) Applicant: Illuscio, Inc., Culver City, CA (US)

(72) Inventors: Stephen Lesser, Wellington (NZ); Joseph Nordling, Roeland Park, KS (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/225,669

(22) Filed: Jun. 2, 2025

(51) Int. Cl.
| | |
|---|---|
| *G06T 15/02* | (2011.01) |
| *G06T 15/20* | (2011.01) |
| *G06T 19/20* | (2011.01) |

(52) U.S. Cl.
CPC .............. *G06T 15/02* (2013.01); *G06T 15/20* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2004/0012603 A1* | 1/2004 | Pfister ..................... | G06T 15/08 345/582 |
| 2021/0065434 A1* | 3/2021 | Öztireli ................. | G06T 15/205 |
| 2025/0157114 A1* | 5/2025 | Yuan ....................... | G06T 13/40 |

OTHER PUBLICATIONS

Jaehoon Choi, Yonghan Lee, Hyungtae Lee, Heesung Kwon, Dinesh Manocha, "MeshGS: Adaptive Mesh-Aligned Gaussian Splatting for High-Quality Rendering", Dec. 8, 2024, Springer, Computer Vision—ACCV 2024: 17th Asian Conference on Computer Vision, Proceedings, Part IX, pp. 262-279.*

Bernhard Kerbl, Georgios Kopanas, Thomas Leimkuehler, George Drettakis, "3D Gaussian Splatting for Real-Time Radiance Field Rendering", Jul. 26, 2023, ACM, ACM Transactions on Graphics (TOG), vol. 42, Issue 4, Article No. 139, pp. 1-14.*

Carolina Bento, "Stochastic Gradient Descent explained in real life", Jun. 2, 2021, website, https://medium.com/data-science/stochastic-gradient-descent-explained-in-real-life-predicting-your-pizzas-cooking-time-b7639d5e6a32.*

(Continued)

*Primary Examiner* — Robert Bader
(74) *Attorney, Agent, or Firm* — Ansari Katiraei LLP; Arman Katiraei; Sadiq Ansari

(57) ABSTRACT

A splat generation system and associated methods implement a modified splatting pipeline that quantifies loss at each splat generation iteration without rendering the splats generated at each iteration or comparing the resulting visualization against reference images of a 3D asset. The system receives the 3D asset and generates a splat representation of the 3D asset. The system compares geometric similarity between different sets of generated splats in different regions of the splat representation and different sets of 3D primitives in corresponding regions of the 3D asset. The system adjusts a set of splats in response to the geometric similarity between the set of splats and a set of 3D primitives in corresponding regions not satisfying a threshold, and reconstructs the 3D asset with an acceptable amount of loss based on the adjustments made to the splats on a region-by-region basis.

20 Claims, 7 Drawing Sheets

(56) References Cited

OTHER PUBLICATIONS

Yueh-Cheng Liu, Lukas Höllein, Matthias Nießner, Angela Dai, "QuickSplat: Fast 3D Surface Reconstruction via Learned Gaussian Initialization", May 8, 2025, arXiv.org, arXiv:2505.05591, https://arxiv.org/abs/2505.05591v1.*

Yue Pan, Xingguang Zhong, Liren Jin, Louis Wiesmann, Marija Popovic, Jens Behley, Cyrill Stachniss, "PINGS: Gaussian Splatting Meets Distance Fields within a Point-Based Implicit Neural Map", Feb. 9, 2025, arXiv.org, arXiv:2502.05752v1, https://arxiv.org/abs/2502.05752v1.*

Zoubin Bi, Yixin Zeng, Chong Zeng, Fan Pei, Xiang Feng, Kun Zhou, Hongzhi Wu, "GS3: Efficient Relighting with Triple Gaussian Splatting", Dec. 3, 2024, ACM, SA '24: SIGGRAPH Asia 2024 Conference Papers. Article No. 12, pp. 1-12.*

David Charatan, Sizhe Lester Li, Andrea Tagliasacchi, Vincent Sitzmann, "PixelSplat: 3D Gaussian Splats from Image Pairs for Scalable Generalizable 3D Reconstruction", Jun. 22, 2024, IEEE, 2024 IEEE/CVF Conference on Computer Vision and Pattern Recognition (CVPR), pp. 19457-19467.*

Sara Fridovich-Keil, Alex Yu, Matthew Tancik, Qinhong Chen, Benjamin Recht, Angjoo Kanazawa, "Plenoxels: Radiance Fields without Neural Networks", Jun. 24, 2022, IEEE, 2022 IEEE/CVF Conference on Computer Vision and Pattern Recognition (CVPR), pp. 5491-5500.*

Antoine Guedon, Vincent Lepetit, "SuGaR: Surface-Aligned Gaussian Splatting for Efficient 3D Mesh Reconstruction and High-Quality Mesh Rendering", Jun. 22, 2024, IEEE, 2024 IEEE/CVF Conference on Computer Vision and Pattern Recognition (CVPR), pp. 5354-5363.*

Binbin Huang, Zehao Yu, Anpei Chen, Andreas Geiger, Shenghua Gao, "2D Gaussian Splatting for Geometrically Accurate Radiance Fields", Jul. 13, 2024, ACM, SIGGRAPH '24: ACM SIGGRAPH 2024 Conference Papers Article No. 32, pp. 1-11.*

Yanyan Li, Chenyu Lyu, Yan Di, Guangyao Zhai, Gim Hee Lee, Federico Tombari, "GeoGaussian: Geometry-aware Gaussian Splatting for Scene Rendering", Jul. 17, 2024, arXiv.org, arXiv:2403.11324v2, https://arxiv.org/abs/2403.11324.*

Zhicheng Lu, Xiang Guo, Le Hui, Tianrui Chen, Min Yang, Xiao Tang, Feng Zhu, Yuchao Dai, "3D Geometry-aware Deformable Gaussian Splatting for Dynamic View Synthesis", Jun. 22, 2024, IEEE, 2024 IEEE/CVF Conference on Computer Vision and Pattern Recognition (CVPR), pp. 8900-8910.*

* cited by examiner

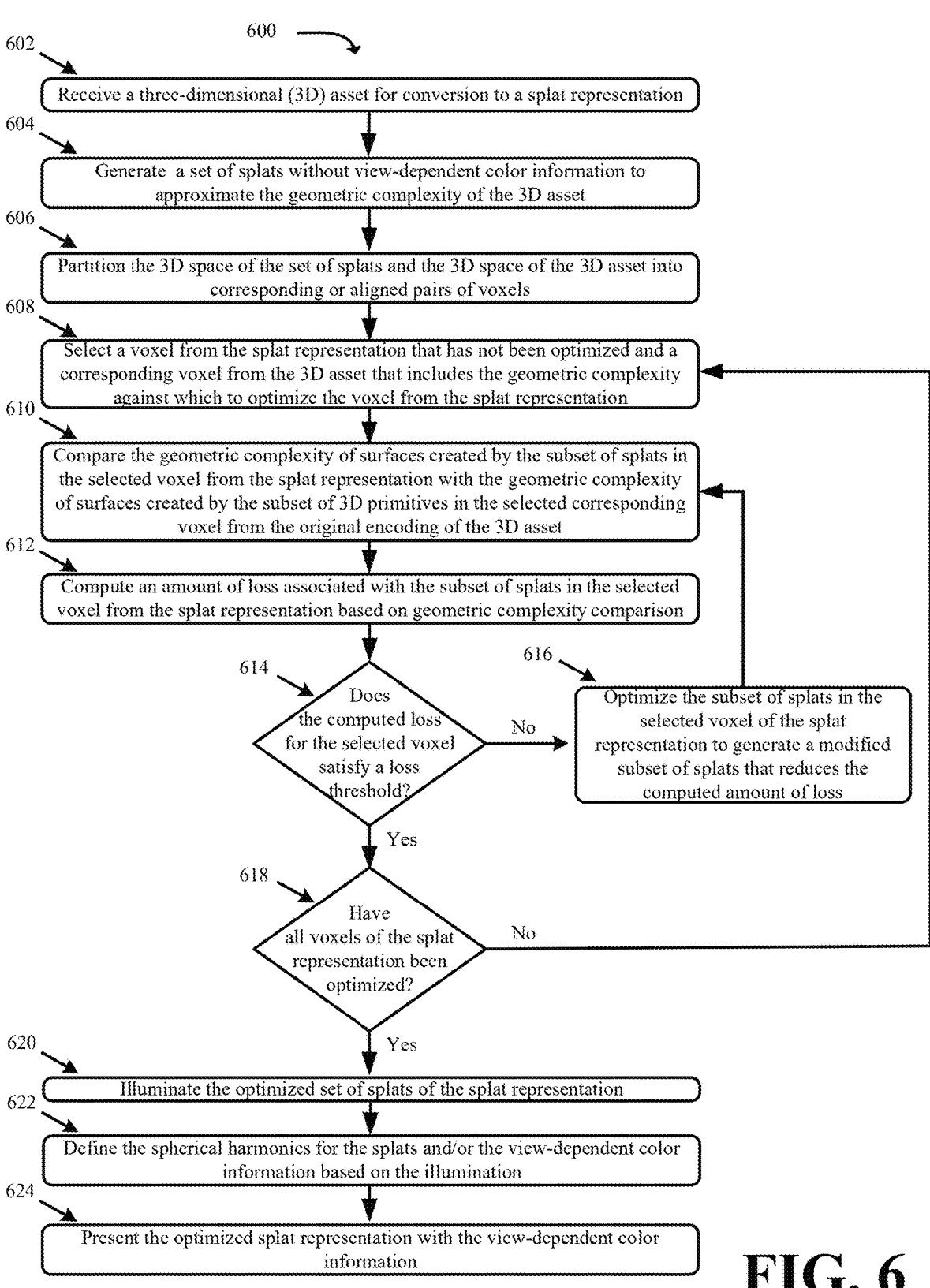

602 — Receive a three-dimensional (3D) asset for conversion to a splat representation 604 — Generate a set of splats without view-dependent color information to approximate the geometric complexity of the 3D asset 606 — Partition the 3D space of the set of splats and the 3D space of the 3D asset into corresponding or aligned pairs of voxels 608 — Select a voxel from the splat representation that has not been optimized and a corresponding voxel from the 3D asset that includes the geometric complexity against which to optimize the voxel from the splat representation 610 — Compare the geometric complexity of surfaces created by the subset of splats in the selected voxel from the splat representation with the geometric complexity of surfaces created by the subset of 3D primitives in the selected corresponding voxel from the original encoding of the 3D asset 612 — Compute an amount of loss associated with the subset of splats in the selected voxel from the splat representation based on geometric complexity comparison 614 — Does the computed loss for the selected voxel satisfy a loss threshold?

616 — No → Optimize the subset of splats in the selected voxel of the splat representation to generate a modified subset of splats that reduces the computed amount of loss Yes 618 — Have all voxels of the splat representation been optimized?

No

Yes

620 — Illuminate the optimized set of splats of the splat representation

622 — Define the spherical harmonics for the splats and/or the view-dependent color information based on the illumination 624 — Present the optimized splat representation with the view-dependent color information

SYSTEMS AND METHODS FOR GENERATING A SPLAT REPRESENTATION OF A THREE-DIMENSIONAL ASSET WITHOUT AN ITERATIVE RENDERING PHASE

BACKGROUND

Gaussian splatting includes obtaining a set of images that capture a three-dimensional (3D) asset from different viewpoints, reconstructing the 3D model by determining the relative positions of the cameras used to capture the set of images, and iteratively generating and refining different sets of splats until a particular set of splats matches the visual detail in the set of images with an acceptable loss. Gaussian splatting is computationally expensive because the set of splats generated at each iteration is rendered and the resulting visualization is compared against the set of images in order to determine the amount of loss and/or refinements or changes to make in a subsequent iteration. It may take hundreds or thousands of iterations depending on the complexity of the 3D asset in order to arrive at the final set of splats that reproduce the 3D asset with the acceptable loss with the rendering and visualization comparison steps being the more computational expensive and time consuming steps of the splatting pipeline. Consequently, the splat generation process may take tens of minutes or hours to produce an acceptable splat representation of a single 3D asset.

BRIEF DESCRIPTION OF THE DRAWINGS

FIG. 6 presents a process for the modified splatting pipeline that separates the splat generation phase from the view-dependent color definition phase in order to efficiently create a splat representation of a 3D asset in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Provided are systems and associated methods for generating a splat representation of a three-dimensional (3D) asset without the iterative rendering phase of the splatting pipeline. The systems and methods modify the splatting pipeline to quantify loss at each splat generation iteration based on a 3D comparison that replaces the need to render the splats generated at each iteration or to compare the resulting visualization against reference images of the 3D asset. The 3D comparison may be efficiently computed from values or distributions that are derived from the positional data associated with the generated splats and the original 3D primitives of the 3D asset. In some embodiments, the 3D comparison may include a comparison of the surface normal distribution between the generated splats and the corresponding set of 3D primitives from the 3D asset that are represented or reconstructed by the generated splats.

Figure 1:
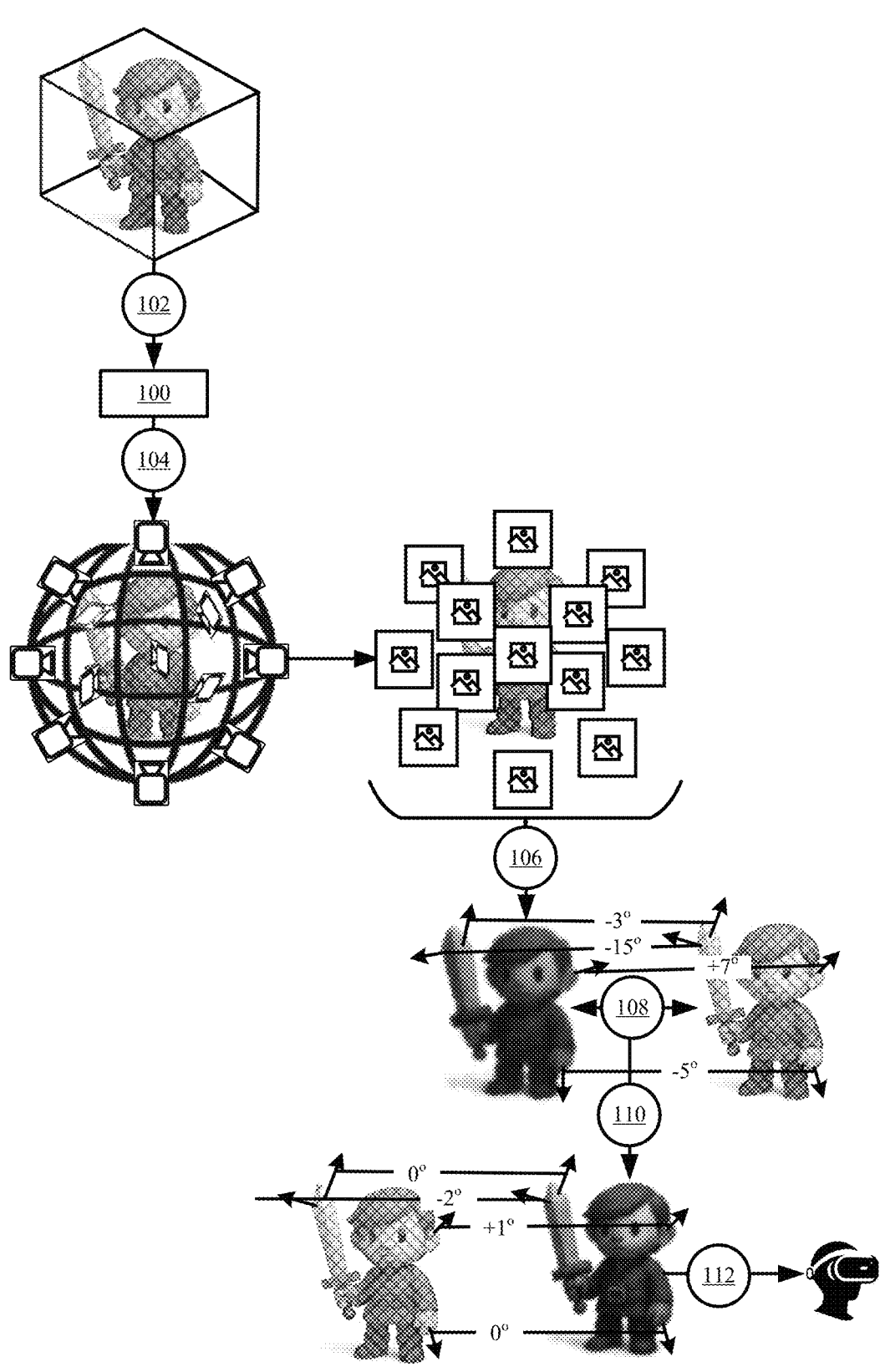
FIG. 1 illustrates an example of generating a splat representation of a three-dimensional (3D) asset based on 3D comparison that replaces the iterative rendering phase in the splatting pipeline in accordance with some embodiments presented herein.

FIG. 1 illustrates an example of generating a splat representation of a 3D asset based on 3D comparison that replaces the iterative rendering phase in the splatting pipeline in accordance with some embodiments presented herein. Splat generation system 100 receives (at 102) a 3D asset and a request to convert the 3D asset into a splat format (e.g., a 3D Gaussian splat representation). For instance, the 3D asset may be defined as a mesh model with a connected set of meshes or polygons that construct the 3D shape and visual characteristics of one or more objects or environments represented by the 3D asset. Alternatively, the 3D model may be defined as a point cloud with a distributed and disconnected set of points that construct the 3D shape and visual characteristics of the one or more objects or environments represented by the 3D model.

Splat generation system 100 generates (at 104) a set of images that capture the 3D asset from different perspectives. In some embodiments, the set of images may be generated based on a placement of virtual cameras around the 3D asset with the set of images capturing the rendered visualization of the 3D asset from each virtual camera position.

Splat generation system 100 performs (at 106) a splatting iteration that generates a set of splats to represent or reconstruct the 3D asset as captured in the set of images. Generating the set of splats may include inputting the set of images into a neural network or radiance field modeler. The neural network determines the positions at which the images were taken and generates the set of splats to reconstruct or approximately recreate the visual detail for the different 3D asset surfaces or regions in the images. Each generated splat may be defined with (x,y,z) coordinates, a covariance matrix that stores a scaling value for the radius or shape of the splat, orientation or rotational information, and/or other shape or positional parameters of the splat, and/or spherical harmonics that represent some visual characteristics of the splat.

In some embodiments, splat generation system 100 may forgo generating (at 104) the set of images. In some such embodiments, splat generation system 100 may perform (at 106) the splatting iteration by generating the set of splats based on a single rendering of the 3D asset primitives (e.g., meshes or points) or based on positional values and/or visual characteristics defined for the 3D asset primitives. For instance, splat generation system 100 may generate a splat to replace a set of 10 neighboring meshes or points or may generate a splat to replace a set of meshes or points that form a common surface.

After each splatting iteration, the splatting pipeline typically includes an iterative rendering phase. During the iterative rendering phase, the generated set of splats are rendered and the resulting visualization is compared against the set of images using a loss function. The loss function quantifies the visual dissimilarity between the rendered splat visualization and the 3D asset as captured in the set of images.

Splat generation system 100 replaces the computationally expensive and time consuming iterative rendering phase of the splatting pipeline with an exponentially more efficient 3D comparison. The 3D comparison includes calculating (at 108) geometric dissimilarity between the generated set of splats and the 3D primitives that define the 3D asset. Calculating (at 108) the geometric dissimilarity involves mathematical or numerical comparisons that are executed in significantly less time than the splat rendering and visual comparison operations of the iterative rendering phase. In some embodiments, calculating (at 108) the geometric dissimilarity includes determining an amount by which the angle of surface normals for splats representing a particular part or surface of the 3D asset deviate from the angle of surface normals for the 3D primitives that represent the same particular part or surface of the 3D asset. In some embodiments, the geometric dissimilarity is calculated (at 108) based on differences in the distribution of normals between the generated set of splats and the 3D primitives of the original 3D asset.

A loss function is derived based on the calculated (at 108) geometric dissimilarity. For instance, the loss function may convert the surface normal deviation for a particular part, surface, or region of the 3D asset or between a subset of splats and a corresponding subset of 3D primitives into a quantified amount of loss based on the deviation between the surface normals for the surfaces, splats, and/or 3D primitives.

Splat generation system 100 performs (at 110) additional splatting iterations based on calculated (at 108) geometric dissimilarity and/or loss that is quantified from the geometric dissimilarity and/or geometric distribution. The additional splatting iterations refine or tune the previously generated set of splats to more closely match the geometric distribution or normal distribution of the 3D asset. The additional splatting iterations may include repositioning or reorienting the previously generated set of splats, adding new splats to the previously generated set of splats, and/or removing splats from the previously generated set of splats to increase the geometric similarity between the current set of splats and the 3D asset primitives. After each additional splatting iteration (e.g., changing one or more splats from the previous set of splats), splat generation system 100 may recalculate the geometric dissimilarity to determine if the changes to the splats reduced or exacerbated the geometric dissimilarity and/or to determine if the changes to the splats results in a threshold of amount of loss or geometric similarity between the current set of splats and the 3D asset primitives. For instance, splat generation system 100 may halt the splatting iterations once the surface normals for the generated set of splats or the surfaces represented by the generated set of splats deviate by less than 10% from the surface normals of the 3D asset primitives or the surfaces formed by the 3D asset primitives.

Splat generation system 100 presents (at 112) the current set of splats as the splat representation of the 3D asset in response to determining that the current set of splats represents the geometric complexity of the 3D asset with an acceptable or threshold amount of loss. Presenting (at 112) the current set of splats may include rendering the current set of splats to create a 3D visualization, streaming the current set of splats to a requesting user device, and/or storing the current set of splats as the splat representation of the 3D asset for subsequent distribution in response to requests for the 3D asset.

In some embodiments, the set of splats generated and optimized based on the 3D comparisons may lack color information. The 3D comparison or loss quantification based on the 3D comparison accounts for the geometric dissimilarity between the splat representation and the original 3D asset and not the visual dissimilarity. Accordingly, splat generation system 100 may generate the set of splats without color information or with minimal visual characteristics. For instance, splat generation system 100 may not define the spherical harmonics that produce the view-dependent coloring of a splat, but may define the splats with absorption, scattering, emission, and/or material characteristics. One or more of these characteristics may be inherited or copied over from the 3D primitives that are positioned in the same space or that form the same surface as the splats inheriting those characteristics.

Splat generation system 100 further modifies the splatting pipeline to define the view-dependent color information for the generated splats of the 3D asset splat representation separately from the splat generation iterations. In particular, splat generation system 100 adds the color or radiance information to the splats in a subsequent or final phase of the splatting pipeline that is performed after the splat generation iterations are complete and an optimized set of splats with geometric similarity to the original 3D asset are generated.

To simplify the 3D comparison and splat generation iterations, splat generation system 100 may partition the 3D asset into voxels and perform the splat generation iterations on a voxel-by-voxel basis. In other words, rather than perform the 3D comparison and splat tuning across the entirety of the 3D asset and/or all generated splats at one iteration or one time, splat generation system 100 may localize the 3D comparison to the splats in each particular voxel and may tune or refine the splats in that particular voxel until the geometric similarity in that particular voxel satisfies a threshold or loss function. By localizing the splatting to the individual voxels rather than the entire 3D space of the 3D asset, splat generation system reduces the memory usage, reduces the number of 3D comparisons, and reduces the complexity of tuning or refining the splats by reducing the number of splats that are tuned or refined at any given time to satisfy the quality or loss function thresholds. Consequently, localizing the splatting to the individual voxels reduces the time to complete the splatting pipeline and to generate the splat representation of the 3D asset.

Figure 2:
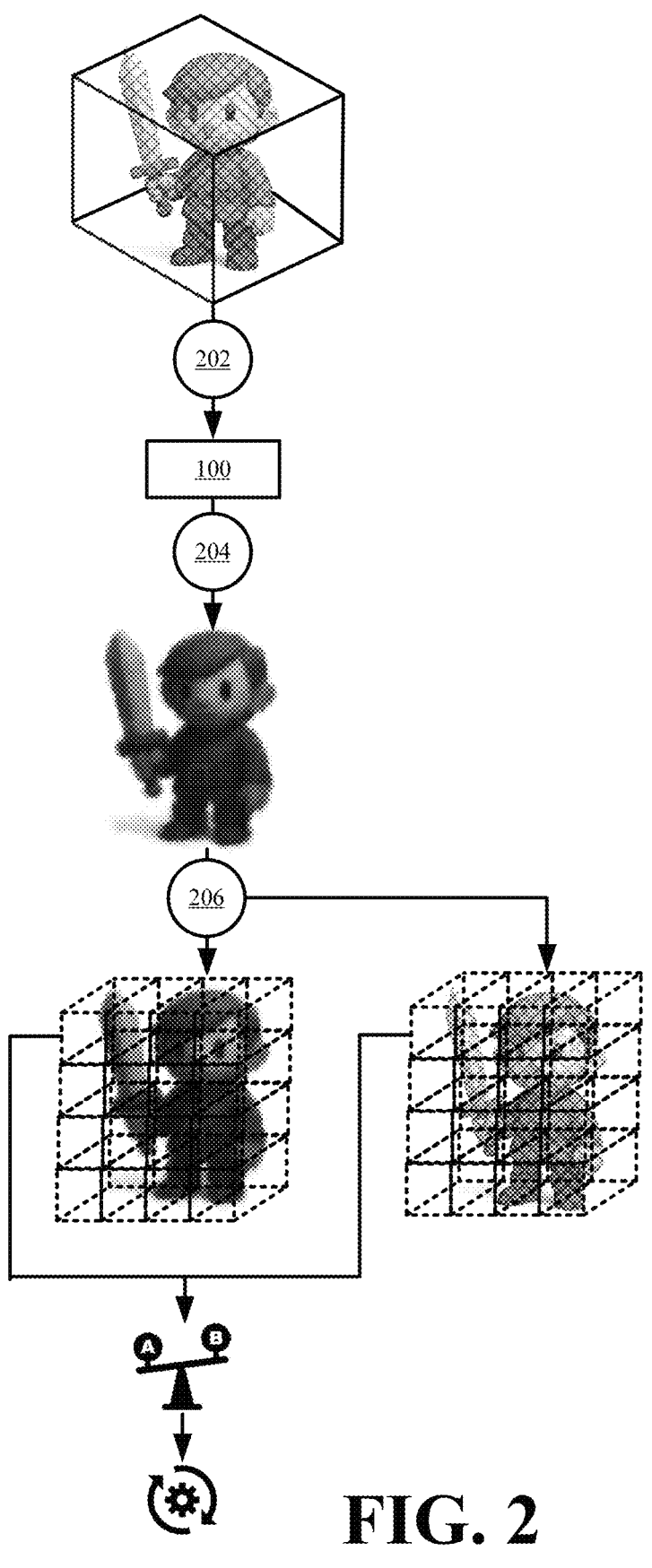
FIG. 2 illustrates an example of partitioning the 3D space of a splat representation into voxels for a voxel-by-voxel optimization of the splat representation in accordance with some embodiments presented herein.

FIG. 2 illustrates an example of partitioning the 3D space of a splat representation into voxels for a voxel-by-voxel optimization of the splat representation in accordance with some embodiments presented herein. Splat generation system 100 receives (at 202) an original encoding of the 3D asset. The original encoding may include a mesh model, point cloud, or high-fidelity splat encoding of the 3D asset.

Splat generation system 100 generates (at 204) an initial set of splats for an initial spalt representation of the 3D asset. For instance, splat generation system 100 performs a first splatting iteration to produce the initial set of splats. The initial set of splats provide a rough or geometrically approximate representation of the 3D asset.

The initial set of splats may be generated to roughly match the shape and form of the 3D asset using different views or images taken from different perspectives of the 3D asset. In some embodiments, the initial set of splats is a lower fidelity representation of a high-fidelity splat encoding. In some other embodiments, the initial set of splats represents the 3D asset with a different set of 3D primitives (e.g., Gaussian splats) than those used to defined or encode the original encoding of the 3D asset (e.g., points or meshes). In some embodiments, splat generation system 100 generates (at 304) the initial set of splats without view-dependent color information. For instance, the splats may be generated with a position, orientation, and/or shape parameter (e.g., one or more radii) to create a 3D shape or form without color information. In some embodiments, splat generation system 100 may generate (at 304) the splats with partial color information that is directly inherited from the 3D primitives of the 3D asset original encoding. For instance, splat generation system 100 may generate (at 304) a splat at a position that coincides with the position of two meshes or two points of the 3D asset. Splat generation system 100 may define the splat with absorption and/or scattering parameters based on absorption and/or scattering parameters of the two meshes or two points. In any event, the 3D space in which the initial splat representation is defined matches or maps the 3D space in which the 3D asset original encoding is defined.

Prior to performing the 3D comparisons and/or tune the set of splats according to geometric dissimilarity detected through the 3D comparisons, splat generation system 100 partitions (at 206) a first 3D space in which the initial set of splats are defined and a corresponding second 3D space in which the 3D primitives of the 3D assets are defined into voxels. Each voxel corresponds to a unique volume within the first or second 3D space that encompasses one or more splats or 3D primitives positioned within that volume. The voxels in the first 3D space match the voxels in the second 3D space such that the splats contained within each voxel in the first 3D space form the same surfaces or features of the 3D asset as the 3D primitives (e.g., meshes or points) contained within a corresponding voxel in the second 3D space. In other words, splat generation system 100 equally partitions (at 206) the 3D space of the initial set of splats and the 3D asset original encoding into an aligned, matching, or corresponding set of voxels.

The voxel size may vary depending on the complexity of the 3D asset and may be selected to minimize the number of different surfaces that fall within each voxel. In some embodiments, splat generation system 100 may partition (at 206) the 3D spaces into voxels of different sizes such that each voxel contains 3D primitives for an equal number of surfaces, a maximum number of surfaces, or a single surface. A voxel corresponds to a volume of the partitioned 3D space. Each voxel may be identified by an index or by positional coordinates corresponding to the volume encompassed by that voxel.

Splat generation system 100 optimizes the splats to better match the geometric complexity and reduce the geometric dissimilarity with the 3D asset on a voxel-by-voxel basis. For instance, when performing subsequent splatting iterations, splat generation system 100 selects the splats in a particular voxel of the first 3D space and compares the distribution of normals in that particular voxel to the distribution of normals in a corresponding voxel of the second 3D space containing the 3D asset primitives representing the same surfaces or regions of the 3D asset as the splats in the particular voxel. Splat generation system 100 may optimize or tune the splats in the particular voxel until the 3D comparison or distribution of normals deviates by less than a threshold amount from the distribution of normals in the corresponding voxel of the second 3D space and continues the splat selection, 3D comparison, and splat tuning on a voxel-by-voxel basis until the geometric distribution across the entire splat representation matches the geometric distribution of the original 3D asset by the threshold amount.

Figure 3:
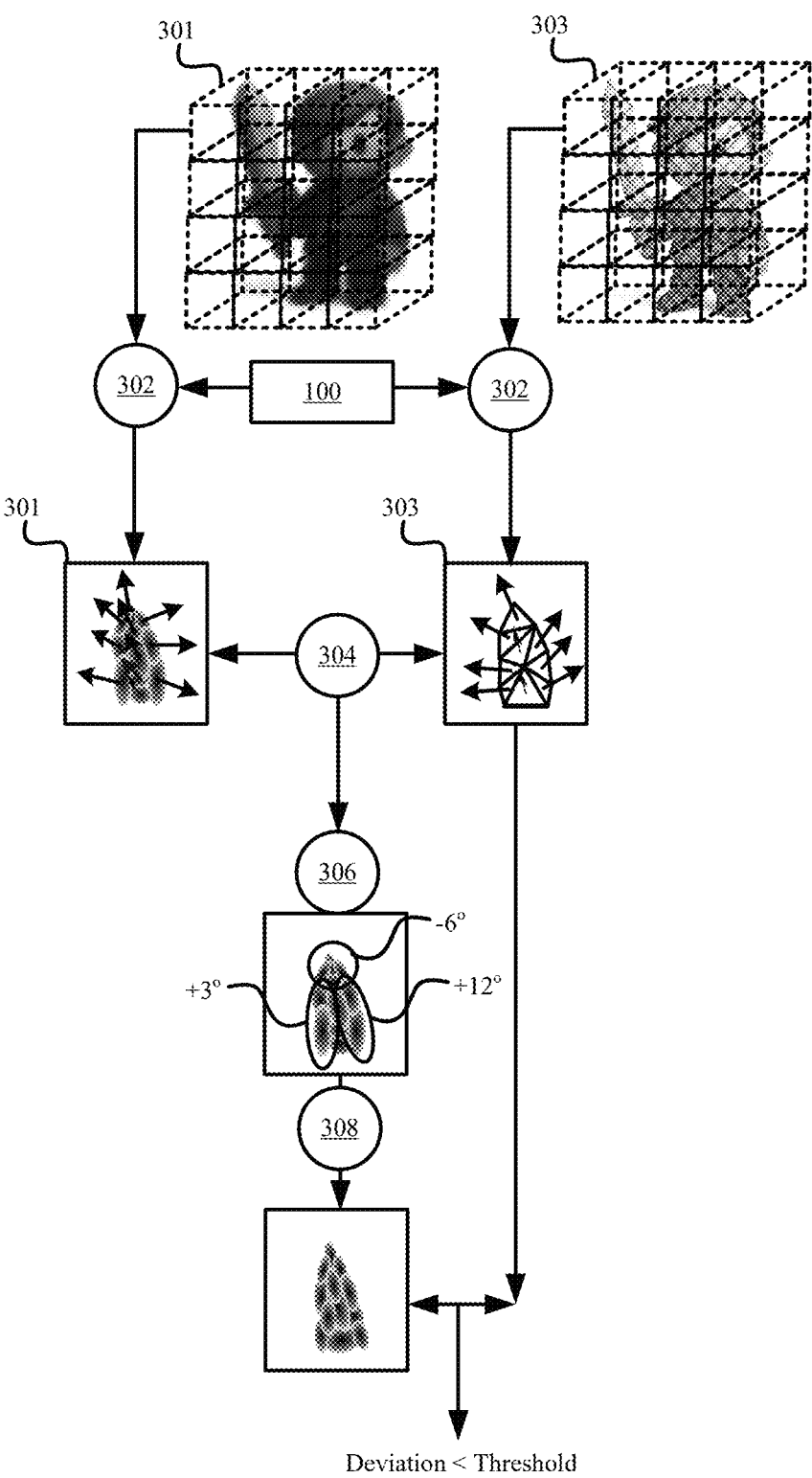
FIG. 3 illustrates an example of a 3D comparison performed in corresponding voxels of the splat representation and the original 3D asset in accordance with some embodiments presented herein.

FIG. 3 illustrates an example of a 3D comparison performed in corresponding voxels of the splat representation and the original 3D asset in accordance with some embodiments presented herein. Splat generation system 100 selects (at 302) voxel 301 in the 3D space of the initial splat representation and corresponding voxel 303 in the 3D space of 3D asset original encoding. Voxel 301 and 303 encode or represent the same surfaces or features of the 3D asset using different 3D primitives or at different levels-of-details using the same type of 3D primitives.

Splat generation system 100 compares (at 304) the surface normals of the 3D primitives in each voxel 301 and 303. The comparison (at 304) may include performing a normal distribution and comparing the normal distribution. In some embodiments, performing the normal distribution includes averaging the direction of the normals in each voxel 301 and 303 and comparing the normal averages to determine an amount by which the surfaces formed by the 3D primitives in each voxel 301 and 303 deviate from one another. In some other embodiments, performing the normal distribution includes calculating changes in the surface normal from one end to an opposite end or across each voxel 301 and 303 and comparing the changes to one another.

Splat generation system 100 determines (at 306) a deviation between the surfaces formed and/or represented in voxel 301 and the original representation of those same surfaces in voxel 303 based on the comparison (at 304). Determining (at 306) the deviation may include detecting different positions or points about the represented surfaces where there is deviation or mismatch in the curvature, shape, or form of the surface and the deviation amount. The deviation amount may correspond to an angle or offset amount between the surfaces or the surface normals.

The surface normal comparison (at 304) and the deviation determination (at 306) become the loss function by which splat generation system 100 determines the accuracy with which the generated set of splats in voxel 301 recreate the surfaces created by the 3D primitives of the 3D asset original encoding in voxel 303. The loss function based on the surface normal comparison (at 304) and the deviation determination (at 306) involves no 3D primitive rendering or image-to-image comparison. Instead, the loss function used by splat generation system 100 involves a series of computations that may be directly performed on a processor in significantly less time than prior art loss functions involving the rendering of a generated set of splats and comparing the rendered image or visualization against a set of reference images of the original 3D asset.

Splat generation system 100 optimizes (at 308) the initial set of splats in voxel 301 according to the deviation determination (at 306). The splat optimization (at 308) may include performing additional splat generation and/or refinement iterations that adjust the initial set of splats to alter the surfaces formed by those splats to better align and/or match with the surfaces formed by the original 3D primitives in voxel 303 of the 3D asset original encoding. After each such iteration, splat generation system 100 may compare (at 304) the surface normals of the adjusted set of splats in voxel 301 to the surface normals of the surfaces created by the 3D primitives of the original encoding in voxel 303 and may determine (at 306) the deviation between the normal distributions in adjusted voxel 301 and voxel 303. Splat generation system 100 may repeat the optimization (at 308) or continually optimize (at 308) the set of splats in voxel 301 until the determined (at 306) deviation is less than a threshold amount (e.g., the surface normal distribution in voxel 301 deviates by less than 10% from the surface normal distribution in voxel 303). The threshold amount corresponds to an acceptable amount of geometric loss in the surfaces created by the splats in voxel 301 and the surfaces created by the 3D primitives of the 3D asset original encoding in voxel 303.

Figure 4:
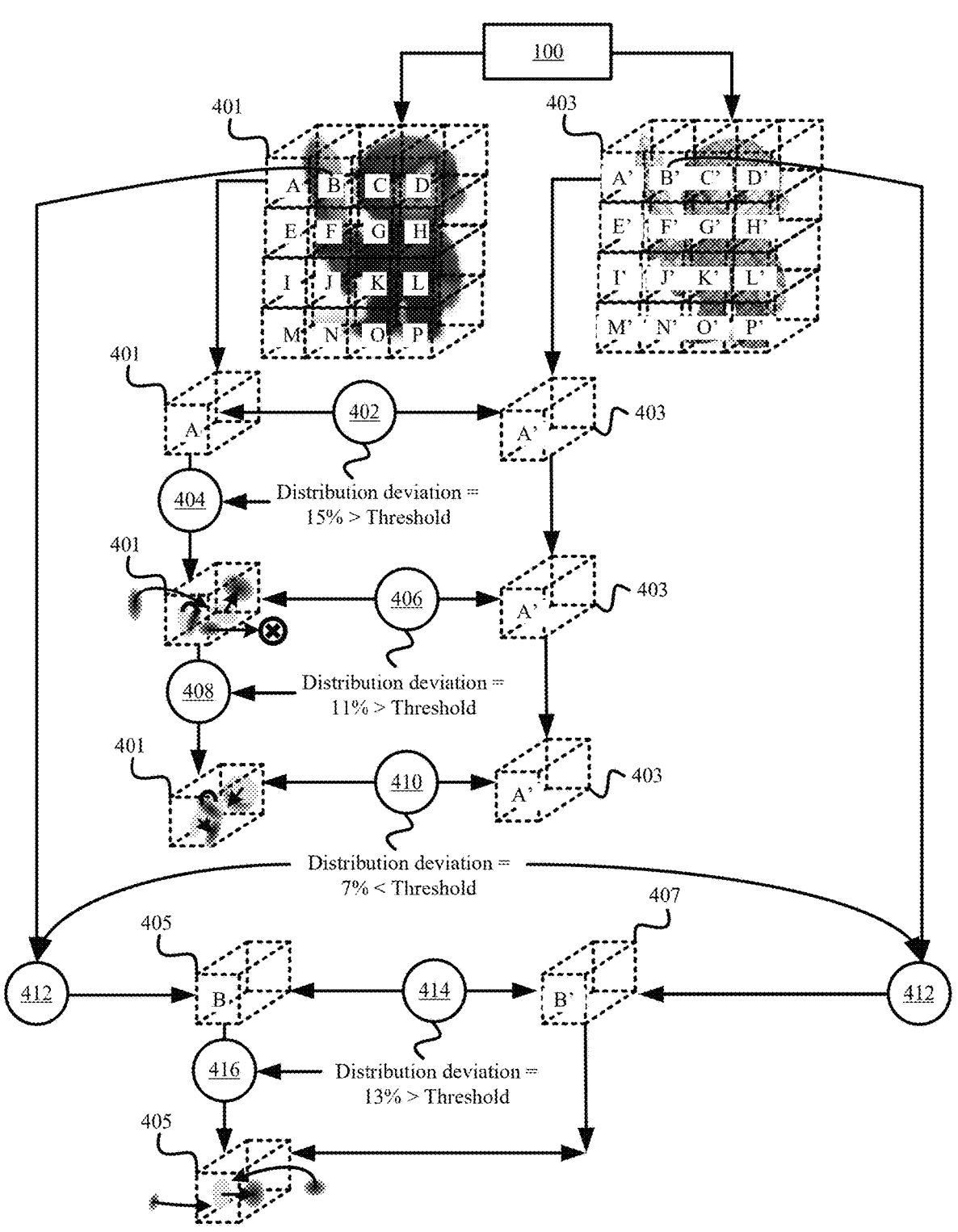
FIG. 4 illustrates an example of optimizing splats on a voxel-by-voxel basis for a splat representation of a 3D asset in accordance with some embodiments presented herein.

FIG. 4 illustrates an example of optimizing splats on a voxel-by-voxel basis for a splat representation of a 3D asset in accordance with some embodiments presented herein. Splat generation system 100 determines (at 402) that the geometric dissimilarity or the normal distribution deviation between surfaces created by splats in voxel 401 of a generated splat representation and surfaces created by 3D primitives in corresponding voxel 403 of an original encoding of the 3D asset is greater than a threshold amount.

Splat generation system 100 adjusts (at 404) one or more splats in voxel 401 according to the determined (at 402) geometric dissimilarity or the normal distribution deviation. In particular, splat generation system 100 determines where in voxel 401 the normal distribution deviation exceeds the threshold amount, and determines a set of adjustments for splats in those regions that reduce or resolve the normal distribution deviation. The adjustments (at 404) includes changing the position or orientation of one or more splats, adding new splats, and/or removing one or more previously generated splats.

Splat generation system 100 recomputes the geometric dissimilarity and/or normal distribution deviation between voxel 401 and voxel 403, and determines (at 406) that the geometric dissimilarity and/or normal distribution deviation is still greater than the threshold amount even after the first adjustment iteration. Accordingly, splat generation system 100 performs (at 408) another adjustment iteration based on the determined (at 406) or updated geometric dissimilarity calculation or normal distribution deviation to further tune or refine the splats in voxel 401 for a closer geometric match to the 3D primitives of voxel 403. Performing (at 408) the additional adjustment iteration includes further adjusting the position or orientation of one or more splats, adding new splats, and/or removing one or more existing splats to further reduce the normal distribution deviation across voxel 401 and 403.

Splat generation system 100 recomputes the geometric dissimilarity and/or normal distribution deviation between voxel 401 and voxel 403 after the second adjustment iteration, determines (at 410) that the geometric dissimilarity and/or the normal distribution deviation satisfies or is less than the threshold amount, and selects (at 412) a next voxel 405 from the splat representation to optimize against a corresponding or aligned voxel 407 of the 3D asset original encoding. The normal distribution deviation satisfies or is less than the threshold amount when the surfaces created by the splats in voxel 401 recreate the surfaces in voxel 403 with an acceptable or configured amount of loss or geometric dissimilarity.

Next voxel 405 is a partitioned volume or region of 3D space in the splat representation that contains splats that have not been compared and optimized relative to the 3D primitives in corresponding or aligned voxel 407. Accordingly, splat generation system 100 determines (at 414) the geometric dissimilarity and/or normal distribution deviation between voxels 405 and 407, and performs (at 416) one or more adjustment or optimization iterations until the normal distribution deviation between voxels 405 and 407 satisfies or is less than the threshold amount. Splat generation system 100 continues in this manner until all voxels of the splat representation have been adjusted and/or optimized to recreate the geometric complexity or geometric forms in the corresponding or aligned voxels of the 3D asset original encoding with an acceptable amount of loss.

In some embodiments, splat generation system 100 may use alternative or additional 3D comparisons to determine the geometric dissimilarity between corresponding voxels of the splat representation and original 3D asset. For instance, splat generation system 100 may determine an amount of deviation between the displacement distribution across corresponding voxels. The displacement distribution may account for the amount by which the splats in a given voxel recreate the roughness or smoothness of a surface created by the 3D primitives in a corresponding or aligned voxel of the original 3D asset. In some embodiments, comparing the displacement distribution may include applying a displacement map or texture to the 3D primitives of the original 3D asset and comparing the surface variation created by the displacement map or texture to the surface variation created by the splats.

The efficiency of the 3D comparison and/or the splat optimization based on the 3D comparison lies in part from excluding the color information when evaluating the loss between the splat representation and the original encoding of the 3D asset. Splat generation system 100 uses the 3D comparison and/or the determination of normal distribution deviation to tune or refine the splats until they accurately recreate or match the geometric complexity of the original 3D asset.

Once the splats are determined to match the geometric complexity of the original 3D asset or have a threshold amount of geometric similarity, splat generation system 100 may define the view-dependent color information for the splats in a distinct and separate phase of the modified splatting pipeline. Prior art splatting combines the geometric complexity matching and the view-dependent color information definition and matching in the same phase of the splatting pipeline and, specifically, during the splat generation iterations. As a result, after each splat generation iteration, the prior art splatting renders the splats generated with the view-dependent color information at the iteration and performs a visual comparison in order to measure geometric similarity as well as color or visual similarity. The visual comparison significantly increases the time to complete each splat generation iteration and the entire splatting pipeline relative to the separate phases for the geometric complexity matching and view-dependent color information definition in the modified splatting pipeline executed by splat generation system 100.

Figure 5:
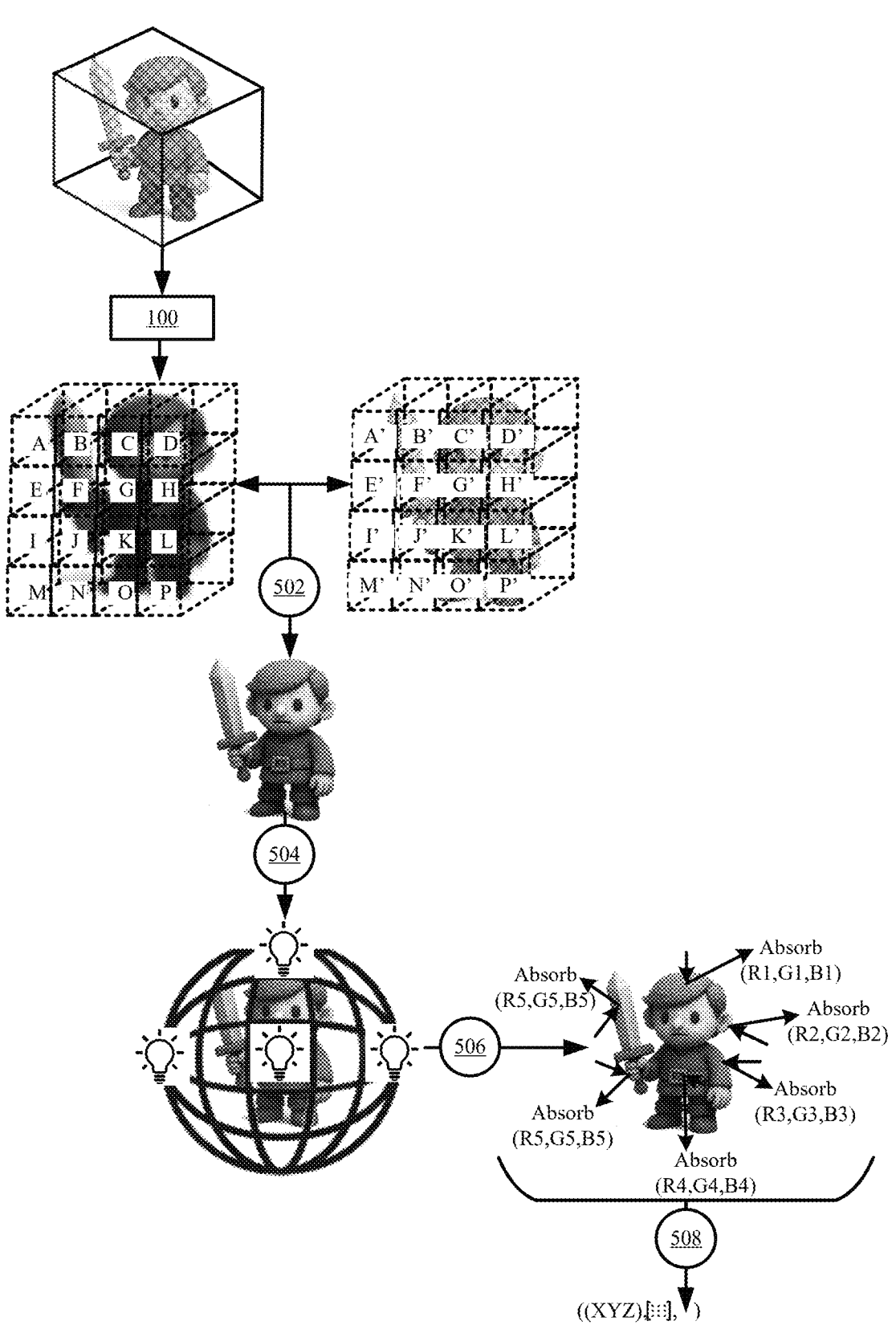
FIG. 5 illustrates an example of defining the view-dependent color for the splats after generating and optimizing the splats to match the geometric complexity of an original 3D asset in accordance with some embodiments.

FIG. 5 illustrates an example of defining the view-dependent color for the splats after generating and optimizing the splats to match the geometric complexity of an original 3D asset in accordance with some embodiments. Splat generation system 100 completes (at 502) the splat generation phase of the modified splatting pipeline to generate a set of splats that reproduce the geometric complexity of an original 3D asset with an acceptable amount of loss and without a complete definition of spherical harmonics that define the view-dependent coloring of the splats. The set of splats are defined with positional and shape parameters including a mean or position in a 3D space and a covariance matrix that defines the shape and orientation of the splat. The set of splats may also inherit absorption, scattering, emission, or material parameters from represented 3D primitives of the original 3D asset. The absorption parameter of a particular splat may define the wavelengths or frequencies of light that are absorbed by the particular splat. The scattering and/or emission parameter of a particular splat may define the wavelengths or frequencies of lights that are scattered or reflected off the particular splat. The material parameter of a particular splat may specify material properties of the particular splat that are associated with specific visual characteristics (e.g., reflectivity, absorption, opacity, etc.).

Splat generation system 100 places (at 504) a virtual light rig around the generated splat representation. The virtual light rig may include one or more light sources for illuminating the 3D space of the splat representation with one or more predefined lighting configurations. For instance, the virtual light rig may include one or more ambient light sources that illuminate all splats of the splat representation equally. Alternatively, the virtual light rig may include one or more spot light sources for illuminating certain surfaces, regions, or features of the splat representation.

Splat generation system 100 performs (at 506) a radiance calculation for each splat of the splat representation based on the light emitted from each light source of the light rig. The radiance calculation defines the view-dependent coloring of each splat. In some embodiments, performing (at 506) the radiance calculation may include performing a ray-tracing variation. In some such embodiments, splat generation system 100 tracks the path of the light rays from each light source of the light rig, determines an amount of light that reaches each splat from different angles, and determines the view-dependent coloring of a splat based on the absorption, scattering, emission, and/or material parameters of the splat and the amount of light reaching that splat from the different angles. Additionally, the light rays may reflect off of a first splat with modified coloring (e.g., white light reflects as green light based on the scattering parameters of the first splat, and may reach a second splat with the modified coloring to impact the radiance calculation of the second splat).

Splat generation system 100 encodes (at 508) the spherical harmonics of the splats based on the radiance calculation. In this manner, splat generation system 100 defines the view-dependent coloring of the splats in a distinct phase of the splatting pipeline that does not affect the positioning, orientation, geometry, or generation of the splats. The view-dependent color and/or spherical harmonics definition may be performed in a single iteration without the need to render the splats, compare the rendered visualization against color information in a set of reference images, modify the splat coloring and/or geometry, and repeat until the visualizations created from rendering the splats match the set of reference images with acceptable geometric and color or visual loss.

FIG. 6 presents a process 600 for the modified splatting pipeline that separates the splat generation phase from the view-dependent color definition phase in order to efficiently create a splat representation of a 3D asset in accordance with some embodiments presented herein. Process 600 is implemented by splat generation system 100.

Splat generation system 100 includes one or more devices or machines with processor, memory, storage, network, rendering, and/or other hardware resources for the generation and conversion of 3D assets or 3D content. In some embodiments, splat generation system 100 may be part of a streaming platform that streams splat representations of 3D content over a data network to facilitate a real-time or on-demand viewing of the 3D content. In some other embodiments, splat generation system 100 is part of a spatial computing, gaming, or other 3D platform that generates splat representations of 3D assets for viewing on local or remote devices.

Process 600 includes receiving (at 602) a 3D asset for conversion to a splat representation. The 3D asset may be encoded in a non-splat format. For instance, the 3D asset may be encoded as a mesh model or a point cloud that is too large to stream in an acceptable amount of time over a data network or to provide a real-time experience. A mesh encoding of the 3D asset may be defined with 3D primitives that form a connected set of meshes. A point cloud encoding of the 3D asset may be defined with 3D primitives that correspond to a disconnected set of points that are distributed about a 3D space. Alternatively, the 3D asset may be encoded as a high resolution or high fidelity 3D Gaussian splat representation that is too large to efficiently stream or too large for a real-time experience. Accordingly, the 3D asset may be converted to a lower resolution or lower fidelity 3D Gaussian splat representation that may be streamed to a client device over a data network in an acceptable amount of time for the real-time experience. In some embodiments, splat generation system 100 receives a request for converting the 3D asset to the splat representation, and the request may include a copy of or link to the original encoding of the 3D asset. The 3D asset may be stored in local storage of splat generation system 100 or may be retrieved remotely from another device over a data network.

Process 600 includes generating (at 604) a set of splats without view-dependent color information to approximate the geometric complexity (e.g., surfaces, features, or forms) of the 3D asset. In some embodiments, splat generation system 100 generates (at 604) the set of splats based on a set of reference images that capture a 360 degree view of the 3D asset. The set of reference images may be input into a neural network. The neural network determines the positions at which each image of the set of reference images is taken and generates the set of splats to model the shape and form of the 3D asset surfaces as captured in the set of reference images. In some other embodiments, splat generation system 100 generates (at 604) the set of splats directly from the positions of the 3D primitives of the 3D asset. For instance, splat generation system 100 may generate a splat to replace one or more meshes, points, or other 3D primitives that form a common surface or feature of the 3D asset, wherein the splat is positioned and shaped to encompass a region of 3D space spanned by the one or more meshes, points, or other 3D primitives replaced by that splat.

Process 600 includes partitioning (at 606) the 3D space of the set of splats and the 3D space of the 3D asset into corresponding or aligned pairs of voxels. The partitioning (at 606) includes encompassing a volume or region containing a subset of the set of splats with a voxel and encompassing the same volume or region containing a subset of 3D primitives from the 3D asset that represent the same surface or feature as the subset of splats with a corresponding voxel.

Process 600 includes selecting (at 608) a voxel from the splat representation that has not been optimized and a corresponding voxel from the 3D asset that includes the geometric complexity against which to optimize the voxel from the splat representation. The selection (at 608) includes targeting a subset of the set of splats to optimize rather than select all splats to optimize at the same time.

Process 600 includes comparing (at 610) the geometric complexity of the one or more surfaces created by the subset of splats in the selected (at 608) voxel from the splat representation with the geometric complexity of the one or more surfaces created by the subset of 3D primitives in the selected (at 608) corresponding voxel from the original encoding of the 3D asset. The comparison (at 610) of the geometric complexity includes determining the geometric similarity across the selected (at 608) voxels or determining the normal distribution, displacement distribution, and/or other positional distribution across each selected (at 608) voxel and comparing the distributions.

Process 600 includes computing (at 612) an amount of loss associated with the subset of splats in the selected (at 608) voxel from the splat representation based on geometric complexity comparison (at 610). In some embodiments, the amount of loss is computed (at 612) based on the detected amount of geometric dissimilarity between the selected (at 608) voxels. The geometric dissimilarity may be derived from deviations in one or more of the normal distribution, displacement distribution, and/or other positional distribution between the selected (at 608) voxels. In some embodiments, the loss is measured at multiple points or positions within the selected (at 608) voxels. For instance, splat generation system 100 may compare the normals at 10 of the same positions across the selected (at 608) voxels in order to compute (at 612) an amount of loss at each analyzed position.

Process 600 includes determining (at 614) whether the amount of loss computed (at 612) for the selected (at 608) voxel of the splat representation satisfies a loss threshold. The loss threshold may be defined by a user and may be adjusted according to a maximum or a total size for the encoding of the splat representation. A larger amount of loss may be acceptable when the splat representation is specified to have a greater size reduction relative to the original encoding of the 3D asset. The determination (at 614) indicates the amount of geometric similarly with which the subset of splats in the selected (at 608) voxel of the splat representation reproduce the surfaces, shapes, and/or forms created by the subset of 3D primitives in the selected (at 608) corresponding voxel of the 3D asset.

Process 600 includes optimizing (at 616) the subset of splats in the selected (at 608) voxel of the splat representation to generate a modified subset of splats that reduces the computed (at 612) amount of loss in response to determining (at 614—No) that the amount of loss exceeds or does not satisfy the loss threshold. Optimizing (at 616) the subset of splats includes repositioning or reorienting one or more splats within the subset of splats, adding new splats to the subset of splats, and/or removing one or more splats from the subset of splats so that the resulting modified subset of splats better matches the geometry, normal distribution, displacement distribution, and/or other positional distribution of the selected (at 608) voxel from the 3D asset. In some embodiments, splat generation system 100 uses the loss calculation to determine positional or geometric deviation at different points across the selected (at 608) voxels and to define adjustments to the subset of splats (e.g., repositioning, reorienting, adding splats, removing splats, etc.) at those different points based on the determined positional or geometric deviation.

Process 600 includes comparing (at 610) the geometric similarity or complexity of the one or more surfaces created by the modified subset of splats in the selected (at 608) voxel from the splat representation to the one or more surfaces created by the subset of 3D primitives in the selected (at 608) corresponding voxel from the original encoding of the 3D asset, and recomputing (at 612) the amount of loss after the subset of splats have been optimized. Process 600 includes determining (at 614) whether the recomputed (at 612) amount of loss associated with the modified subset of splats satisfies the loss threshold.

Process 600 includes determining (at 618) whether all voxels of the splat representation have been optimized to reproduce the geometric complexity in the corresponding voxels of the 3D assets within the loss threshold in response to determining (at 614—Yes) that the amount of loss between the last selected (at 608) voxels does not exceed or does satisfy the loss threshold. In other words, splat generation system 100 determines (at 618) whether all surfaces of the 3D asset are reproduced with an acceptable amount of loss by the splat representation.

Process 600 includes selecting (at 608) a next voxel from the splat representation that has not been optimized and a corresponding voxel from the 3D asset in response to determining (at 618—No) that all voxels of the splat representation have not been optimized. Process 600 repeats the splat optimization on voxel-by-voxel basis until the geometric complexity within the volume or region of each voxel matches the geometric complexity in the corresponding volumes or regions of the 3D asset.

Process 600 includes illuminating (at 620) the optimized set of splats of the splat representation in response to determining (at 618—Yes) that all voxels of the splat representation have been optimized. Illuminating (at 620) the optimized set of splats may include placing one or more light sources in the 3D space of the splat representation. In some embodiments, the type (e.g., ambient, spot, etc.) and position of the light sources may be predefined such that all generated splats are illuminated (at 620) in an equal or similar fashion. In some other embodiments, the type and position of the light sources may be customized by analyzing the lighting or brightness across the 3D asset.

Process 600 includes defining (at 622) the spherical harmonics for the splats and/or the view-dependent color information based on the illumination (at 620). The color definition (at 622) involves determining the light that reaches each splat from different angles and the light wavelengths or frequencies that are presented by each splat from different viewing angles based on the absorption, scattering, emission, and/or materials properties that the splat inherits from one or more mapped or corresponding 3D primitives of the 3D asset.

Process 600 includes presenting (at 624) the optimized splat representation with the view-dependent color information in response to a request for the 3D asset or for the splat representation of the 3D asset. For instance, splat generation system 100 may stream the optimized splat representation with the view-dependent color information to a client device over a data network in response to the client device request for the 3D asset. Alternatively, splat generation system 100 may store the optimized splat representation in non-volatile storage for subsequent presentation.

Figure 7:
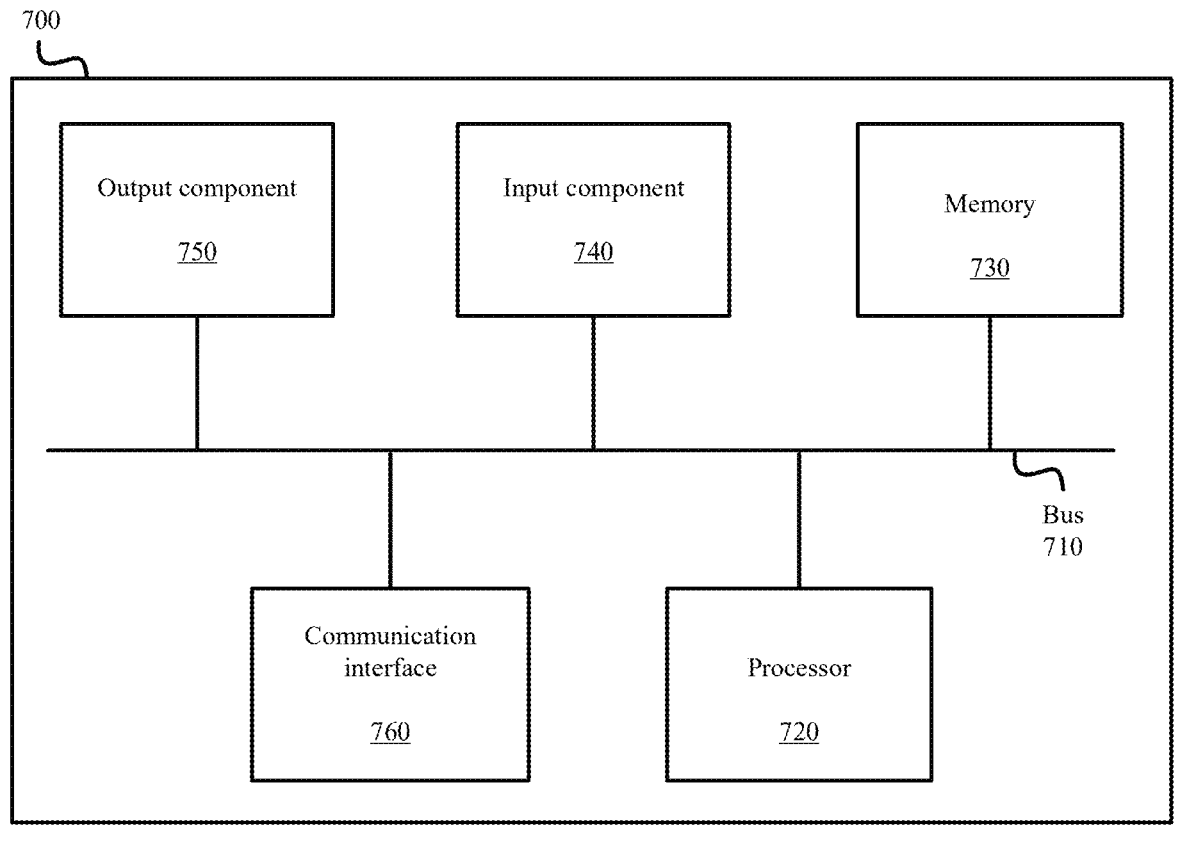
FIG. 7 illustrates example components of one or more devices, according to one or more embodiments described herein.

FIG. 7 is a diagram of example components of device 700. Device 700 may be used to implement one or more of the tools, devices, or systems described above (e.g., splat generation system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/of" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a three-dimensional (3D) asset that is defined with a plurality of 3D primitives;
   generating a splat representation of the 3D asset, wherein the splat representation is defined with a plurality of splats;
   comparing geometric similarity between different sets of splats from the plurality of splats in different regions of the splat representation and different sets of 3D primitives from the plurality of 3D primitives in corresponding regions of the 3D asset over a first set of training iterations that do not adjust colors associated with the plurality of splats;

adjusting a position or a geometry of a set of splats from the different sets of splats without adjusting the colors associated with the set of splats at each training iteration of the first set of training iterations in response to the geometric similarity between the set of splats and a set of 3D primitives from the different sets of 3D primitives in a region of the 3D asset that corresponds to a region with the set of splats in the splat representation not satisfying a threshold;

reconstructing the 3D asset with an acceptable amount of geometric loss with the splat representation based on said adjusting of the set of splats across the first set of training iterations; and performing a color adjustment iteration after the first set of training iterations, wherein performing the color adjustment iteration comprises adjusting the colors of the set of splats to match colors of corresponding 3D primitives from the set of 3D primitives with an acceptable amount of color loss.

2. The method of claim 1 further comprising:

partitioning the different regions of the splat representation into a first plurality of voxels and the corresponding regions of the 3D asset into a corresponding second plurality of voxels;

selecting a first voxel from the first plurality of voxels that encompasses the set of splats and a corresponding first voxel from the corresponding second plurality of voxels that encompasses the set of 3D primitives; and wherein comparing the geometric similarity comprises comparing a geometric complexity of one or more surfaces formed by the set of splats against a geometric complexity of one or more surfaces formed by the set of 3D primitives.

3. The method of claim 1, wherein comparing the geometric similarity comprises:

determining a distribution of normals associated with the set of splats;

determining a distribution of normals associated with the set of 3D primitives; and calculating a deviation between the distribution of normals associated with the set of splats and the distribution of normals associated with the set of 3D primitives.

4. The method of claim 1, wherein comparing the geometric similarity comprises:

determining an amount by which normals across one or more surfaces formed by the set of splats deviate from normals across one or more surfaces formed by the set of 3D primitives.

5. The method of claim 1, wherein comparing the geometric similarity comprises:

determining a deviation between one or more surfaces formed by the set of splats and one or more surfaces formed by the set of 3D primitives; and wherein adjusting the position or the geometry of the set of splats comprises:

modifying one or more of a position or a geometry of the set of splats to reduce the deviation.

6. The method of claim 1, wherein adjusting the position or the geometry of the set of splats comprises one or more of:

repositioning one or more of the set of splats, reorienting one or more of the set of splats, adding one or more new splats to the set of splats, or removing one or more splats from the set of splats.

7. The method of claim 1, wherein adjusting the position or the geometry of the set of splats comprises:

defining an optimized set of splats from the set of splats with greater geometric similarity with the set of 3D primitives than the set of splats.

8. The method of claim 1, wherein adjusting the position or the geometry of the set of splats comprises:

performing one or more optimization iterations, wherein performing the one or more optimization iterations comprises:

producing a different modified set of splats by adjusting one or more splats from the set of splats at each optimization iteration of the one or more optimization iterations;

comparing geometric similarity between the different modified set of splats and the set of 3D primitives at each optimization iteration of the one or more optimization iterations; and halting the one or more optimization iterations in response to the geometric similarity between the different modified set of splats produced at a current optimization iteration and the set of 3D primitives satisfying the threshold.

9. The method of claim 1, wherein performing the color adjustment iteration comprises:

illuminating the splat representation with one or more light sources in response to the geometric similarity between the different sets of splats and the different sets of 3D primitives satisfying the threshold after said adjusting; and defining view-dependent coloring for each particular splat of the splat representation based on light from the one or more light sources reaching the particular splat and one or more absorption, scattering, emission, or material properties of the particular splat.

10. The method of claim 1, wherein generating the splat representation comprises:

defining each particular splat of the plurality of splats with a position in a 3D space, one or more shape parameters, and an absorption, scattering, emission, or material parameter that is inherited from one or more 3D primitives from the plurality of 3D primitives that are represented by the particular splat in the splat representation.

11. The method of claim 1, wherein comparing the geometric similarity comprises:

computing an amount of loss in the region with the set of splats based on different amounts by which a geometry created by the set of splats differs from a geometry created by the set of 3D primitives.

12. The method of claim 1, wherein comparing the geometric similarity comprises:

determining different amounts by which one or more surfaces formed by the set of splats differ from one or more surfaces formed by the set of 3D primitives at corresponding points in the region with the set of splats and the region of the 3D asset.

13. The method of claim 1, wherein generating the splat representation comprises:

receiving a set of reference images that capture different views of the 3D asset; and generating the plurality of splats to recreate different surfaces as captured in the different views of the 3D asset.

14. The method of claim 1, wherein generating the splat representation comprises:

directly replacing the plurality of 3D primitives with the plurality of splats by generating each splat of the plurality of splats with a position and a shape that encompasses a region of 3D space that is spanned by one or more 3D primitives of the plurality of 3D primitives.

15. A splat generation system comprising:

one or more hardware processors configured to:

receive a three-dimensional (3D) asset that is defined with a plurality of 3D primitives;

generate a splat representation of the 3D asset, wherein the splat representation is defined with a plurality of splats;

compare geometric similarity between different sets of splats from the plurality of splats in different regions of the splat representation and different sets of 3D primitives from the plurality of 3D primitives in corresponding regions of the 3D asset over a first set of training iterations that do not adjust colors associated with the plurality of splats;

adjust a position or a geometry of a set of splats from the different sets of splats without adjusting the colors associated with the set of splats at each training iteration of the first set of training iterations in response to the geometric similarity between the set of splats and a set of 3D primitives from the different sets of 3D primitives in a region of the 3D asset that corresponds to a region with the set of splats in the splat representation not satisfying a threshold;

reconstruct the 3D asset with an acceptable amount of geometric loss with the splat representation based on said adjusting of the set of splats across the first set of training iterations; and perform a color adjustment iteration after the first set of training iterations, wherein performing the color adjustment iteration comprises adjusting the colors of the set of splats to match colors of corresponding 3D primitives from the set of 3D primitives with an acceptable amount of color loss.

16. The splat generation system of claim 15, wherein the one or more hardware processors are further configured to:

partition the different regions of the splat representation into a first plurality of voxels and the corresponding regions of the 3D asset into a corresponding second plurality of voxels;

select a first voxel from the first plurality of voxels that encompasses the set of splats and a corresponding first voxel from the corresponding second plurality of voxels that encompasses the set of 3D primitives; and wherein comparing the geometric similarity comprises comparing a geometric complexity of one or more surfaces formed by the set of splats against a geometric complexity of one or more surfaces formed by the set of 3D primitives.

17. The splat generation system of claim 15, wherein comparing the geometric similarity comprises:

determining a distribution of normals associated with the set of splats;

determining a distribution of normals associated with the set of 3D primitives; and calculating a deviation between the distribution of normals associated with the set of splats and the distribution of normals associated with the set of 3D primitives.

18. The splat generation system of claim 15, wherein comparing the geometric similarity comprises:

determining an amount by which normals across one or more surfaces formed by the set of splats deviate from normals across one or more surfaces formed by the set of 3D primitives.

19. The splat generation system of claim 15, wherein comparing the geometric similarity comprises:

determining a deviation between one or more surfaces formed by the set of splats and one or more surfaces formed by the set of 3D primitives; and wherein adjusting the position or the geometry of the set of splats comprises:

modifying one or more of a position or a geometry of the set of splats to reduce the deviation.

20. A non-transitory computer-readable medium storing instructions that, when executed by one or more processors of a splat generation system, cause the splat generation system to perform operations comprising:

receiving a three-dimensional (3D) asset that is defined with a plurality of 3D primitives;

generating a splat representation of the 3D asset, wherein the splat representation is defined with a plurality of splats;

comparing geometric similarity between different sets of splats from the plurality of splats in different regions of the splat representation and different sets of 3D primitives from the plurality of 3D primitives in corresponding regions of the 3D asset over a first set of training iterations that do not adjust colors associated with the plurality of splats;

adjusting a position or a geometry of a set of splats from the different sets of splats without adjusting the colors associated with the set of splats at each training iteration of the first set of training iterations in response to the geometric similarity between the set of splats and a set of 3D primitives from the different sets of 3D primitives in a region of the 3D asset that corresponds to a region with the set of splats in the splat representation not satisfying a threshold;

reconstructing the 3D asset with an acceptable amount of geometric loss with the splat representation based on said adjusting of the set of splats across the first set of training iterations; and performing a color adjustment iteration after the first set of training iterations, wherein performing the color adjustment iteration comprises adjusting the colors of the set of splats to match colors of corresponding 3D primitives from the set of 3D primitives with an acceptable amount of color loss.

* * * * *